United States Patent [19]
Uetake

[11] Patent Number: 5,386,334
[45] Date of Patent: Jan. 31, 1995

[54] TAPE CASSETTE REEL LOCKING MECHANISM

[75] Inventor: Akihiro Uetake, Tokyo, Japan

[73] Assignee: Sony Corporation, Japan

[21] Appl. No.: 16,573

[22] Filed: Feb. 11, 1993

[30] Foreign Application Priority Data

Feb. 20, 1992 [JP] Japan ................................. 4-069394

[51] Int. Cl.6 .......................................... G11B 23/087
[52] U.S. Cl. .................................................... 360/132
[58] Field of Search ................. 360/132; 242/197, 198, 242/199, 343, 343.1, 343.2

[56] References Cited

U.S. PATENT DOCUMENTS

| 3,900,172 | 8/1975 | Kamaya | 242/198 |
| 4,232,840 | 11/1980 | Sugawara | 242/198 |
| 4,768,122 | 8/1988 | Kawada | 360/132 |
| 4,789,113 | 12/1988 | Katagiri et al. | 360/132 |

FOREIGN PATENT DOCUMENTS

| 0140583 | 5/1985 | European Pat. Off. . |
| 0169545 | 1/1986 | European Pat. Off. . |
| 0180759 | 5/1986 | European Pat. Off. . |
| 2015477 | 9/1979 | United Kingdom . |
| 2019356 | 10/1979 | United Kingdom . |

OTHER PUBLICATIONS

EPO Search Report.

Primary Examiner—Stuart S. Levy
Assistant Examiner—William R. Koyuch
Attorney, Agent, or Firm—Ronald P. Kananen

[57] ABSTRACT

A tape cassette having a cassette casing having rotatably contained therein a pair of tape reels having fixed thereto respective ends of a tape and a front lid rotatably supported at the fore end of the cassette casing to cover the front surface of the tape partly led out from the cassette casing through tape outlets provided at the fore end of the cassette casing. The cassette includes reel lock members provided to both side walls of the cassette casing slidably in their forward and backward directions to shift in linkage with opening and closing of the front lid, engagement claws provided rotatably at the rear end sections of the reel lock members to engage in and disengage from engagement teeth provided around the flanges of the tape reels, and elastic deformable members provided between the engagement claws and primary sections to the reel lock members and guide sections to guide the movement of the reel lock members. In operation, the engagement claws of the reel lock members engage in the engagement teeth of the tape reels when the front lid is closed and disengage from the engagement teeth when the front lid is opened.

11 Claims, 10 Drawing Sheets

TAPE CASSETTE REEL LOCKING MECHANISM

BACKGROUND OF THE INVENTION

1. Field of the Invention

This invention relates to a novel tape cassette, more particularly a novel tape cassette which can unlock tape reels without requiring a tape player to be provided with such means as reel lock release pins solely for the purpose of unlocking tape reels, and can prevent a tape from slackening without fail.

2. Description of the Related Art

In many cases, tape cassettes are provided with a reel lock mechanism to lock tape reels with a tape wound up therearound and stop them from rotating in order to prevent slackening of the tape while in storage or transfer.

Conventionally adopted for such tape cassettes is a reel lock mechanism which, when a tape cassette is loaded into a tape player, requires tape reels to be unlocked by reel lock pins provided to the tape loading section of the tape player.

However, a tape player using a tape cassette provided with a reel lock mechanism as described above inevitably requires reel lock release pins as its essential constituent element. Furthermore, a so-called multi-tape compatible tape player allowing the use of tape cassettes of different sizes makes its designing complicated with the position of reel lock release pins and their number needing to be taken into consideration, among other things.

A reel lock mechanism of the type described above also requires a tape cassette to be provided with holes formed in its casing to get the reel lock release pins inserted thereinto. Such a tape cassette is prone to dust which is allowed thereinto through the pin holes and makes it unfavorable and disadvantageous in appearance.

Furthermore, such a conventional tape cassette reel lock mechanism tends to cause slackening of a tape at the time of its unlocking.

OBJECTS AND SUMMARY OF THE INVENTION

To solve the above described problems, this invention has its purpose to provide a tape cassette comprising reel lock members provided to both sides of a cassette casing in a manner to allow them to shift slidably in their forward and backward directions in linkage with opening and closing of a front lid covering the front of the cassette casing, engagement claws provided at the rear end sections of the reel lock members to engage in and disengage from engagement teeth formed around the flanges of tape reels, elastic deformable members provided between the engagement claws and primary sections of the reel lock members and guide sections provided in the cassette casing to guide the movement of the reel lock members, so that when the front lid is closed, the engagement claws of the reel lock members engage in the engagement teeth of the tape reel and, when the front lid is opened, the engagement claws of the reel lock members disengage from the engagement teeth of the tape reels.

Thus, a tape cassette according to the present invention, which shifts its reel lock members in linkage with opening and closing of the front lid and releases tape reels from their locked position by the forward movement of the reel lock members and, therefore, requires no elements such as reel lock release pins to be provided to a tape player for the purpose of releasing the tape reels from their locked position, allows a tape player to be made simple in structure and facilitates a multi-tape compatible tape player, more in particular, to be designed easily.

Since it eliminates holes (insert holes for reel lock release pins) formed in a tape cassette casing, a tape cassette according to the present prevents dust from getting thereinto and does not damage its appearance.

Furthermore, since the reel lock members are provided to both sides of a cassette casing slidably in their forward and backward directions and, when the reel lock members move in their backward direction, their engagement claws engage in the engagement teeth of the tape reels and lock the tape reels, both tape reels are shifted as a whole in a direction to recede away from tape outlets and are energized to rotate in a direction to tension a tape. Thus, the tape is kept constantly under adequate tension without allowing it to slacken thereby preventing problems such so-called tape jamming as caused by tape slackening.

According to one aspect of the present invention, therefore, there is provided a tape cassette having a cassette casing containing rotatably therein a pair of tape reels having respective ends of a tape fixed thereto, and a front lid rotatably supported at the fore end of the cassette casing to cover a front surface of the tape partly led out from the cassette casing through tape outlets provided at the fore end of the cassette casing. The cassette includes reel lock members provided to both side walls of the cassette casing slidably in their forward and backward directions to shift in linkage with opening and closing of the front lid; engagement claws provided rotatably at the rear end sections of the reel lock members to engage in and disengage from engagement teeth provided around the flanges of the tape reels; elastic deformable members provided between the engagement claws and primary sections of the reel lock members; and guide sections provided to the cassette casing to guide the movement of the reel lock members. In operation, the engagement claws of the reel lock members engage in said engagement teeth of the tape reels when said front lid is closed and disengage from the engagement teeth of the tape reels when the front lid is opened.

DETAILED DESCRIPTION OF THE PREFERRED EMBODIMENT

The present invention now will be described hereinafter in detail with reference to the accompanying drawings showing its preferred embodiment 1.

Incidentally, the tape cassette shown in the drawings is a video tape cassette embodying the present invention.

In the drawings, reference numeral 2 designates a cassette casing which presents the form of an elongate flat box as seen from its above and has a pair of tape reels 3, 3 rotatably contained therein. These tape reels 3, 3 have respective ends of a magnetic tape fixed thereto the magnetic tape wound therearound.

The casing 2 has tape outlets 5, 5 formed at the right and left ends of the fore section thereof, and has at the end portions closer to the tape outlets 5, 5 tape guides 6, 6 formed integrally therewith.

The tape guides 6, 6 have their upper ends made smaller in diameter to form small diameter sections 6a, 6a which serve as spring holders.

Designated at 7 is a mouth section which, provided at the fore section of the cassette casing between the tape outlets 5, 5, opens in its front and bottom directions.

Side walls 8, 8 of the cassette casing 2 have their fore ends bent to form cranked sections 8a, 8a in a manner to come in closer to each other, extending forward beyond the cranked sections 8a, 8a lid supporting walls 9, 9 for supporting a front lid to be described later and lid supporting holes 10, 10 formed at the approximately central and slightly upper sections of the lid supporting walls in the forward and backward directions of the supporting walls 9, 9. The cranked sections 8a, 8a are provided with elongate openings 11, 11. As a cassette casing like the cassette casing 2 is practically formed with its upper and lower halves fitted together, the form of each constituent element described above represents its equivalent formed with two halves fitted together.

The cassette casing 2 has the lower surface of its upper wall 12 having projecting guide pins 13, 13 provided at the approximate centers of their respective positions slightly behind the tape outlets 5, 5. Furthermore, the lower surface of the upper wall 12 has projecting guide walls 14, 14 extending forward and backward along their respective positions closer to the side of the mouth section 7 than the guide pins 13, 13.

Reference numeral 15 designates a front lid formed integrally with a front section 16 to cover the front surface of the cassette casing 2, an upper end section 17 inclined slightly backward from the upper edge of the front section 16 to have its upper end abutting against the front edge of the upper wall 12 of the cassette casing 2 and side sections 18, 18 projecting backward from the right and left side edges of the front section 16.

The side sections 18, 18 have lid supporting pins 19, 19 projecting from their inside surfaces. These lid supporting pins 19, 19 are rotatably fitted into the lid supporting holes 10, 10 and, thereby, the front lid 15 is rotatably supported to the fore end section of the cassette casing 2.

The side sections 18, 18 have their rear end edges provided with pressing members 20, 20 projecting backward from their respective positions behind and slightly lower than the lid supporting pins 19, 19 and the pressing member 20 on the right side has a spring holder 21 projecting from its inner surface.

Figure 1:
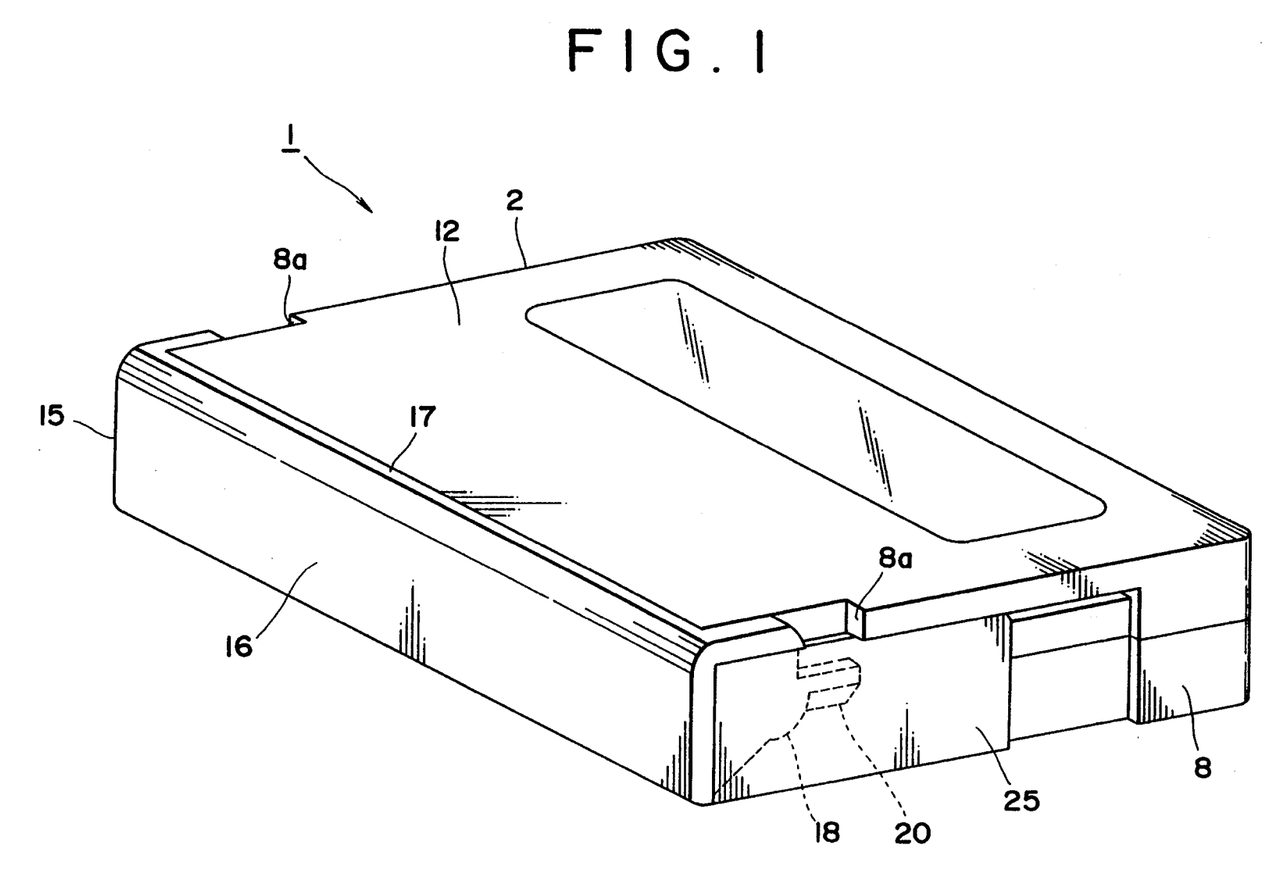
FIG. 1 is a schematic perspective view showing a tape cassette embodying the present invention with its front lid closed.
Figure 4:
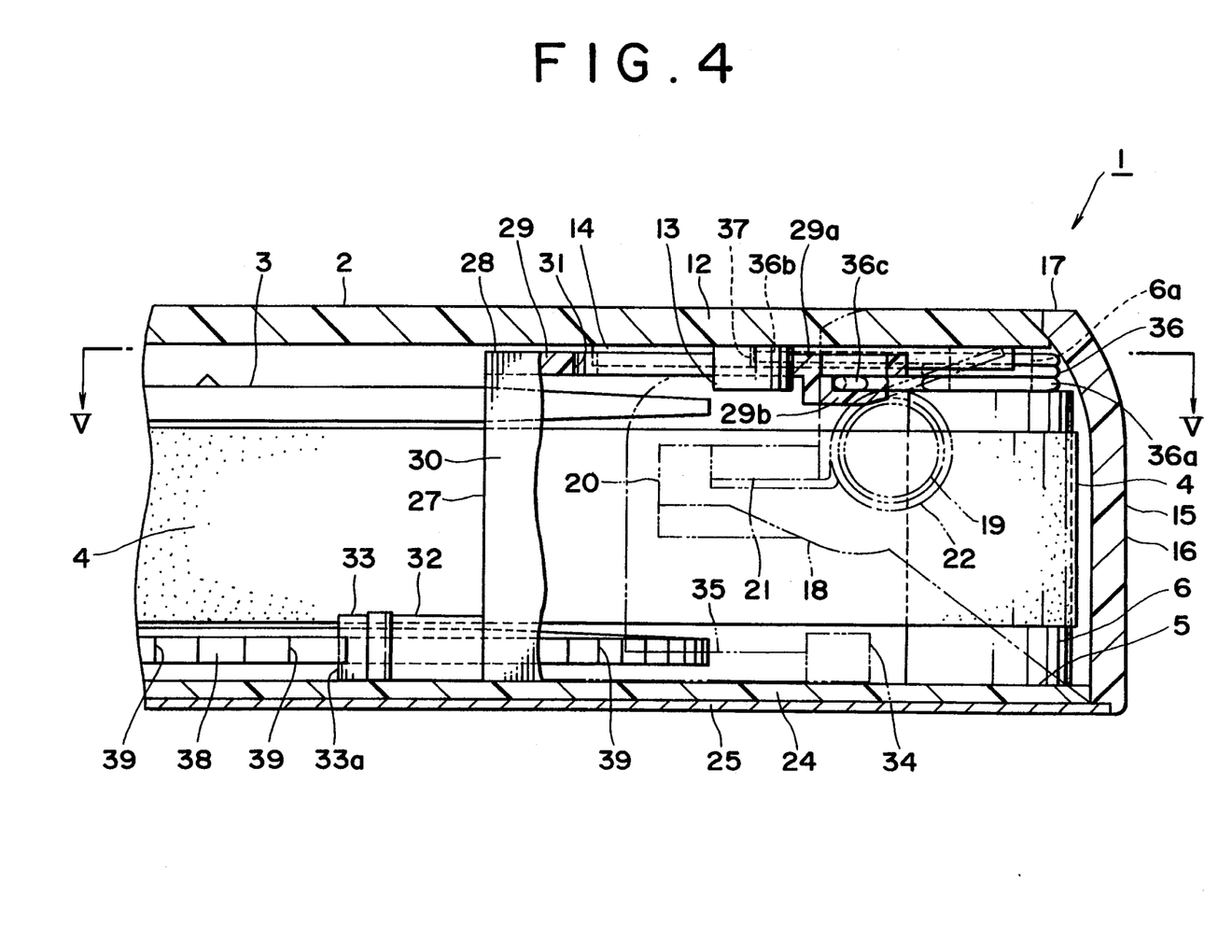
FIG. 4 is a an enlarged cross-sectional view of the tape cassette with its front lid closed taken along the line IV—IV of FIG. 3.
Figure 5:
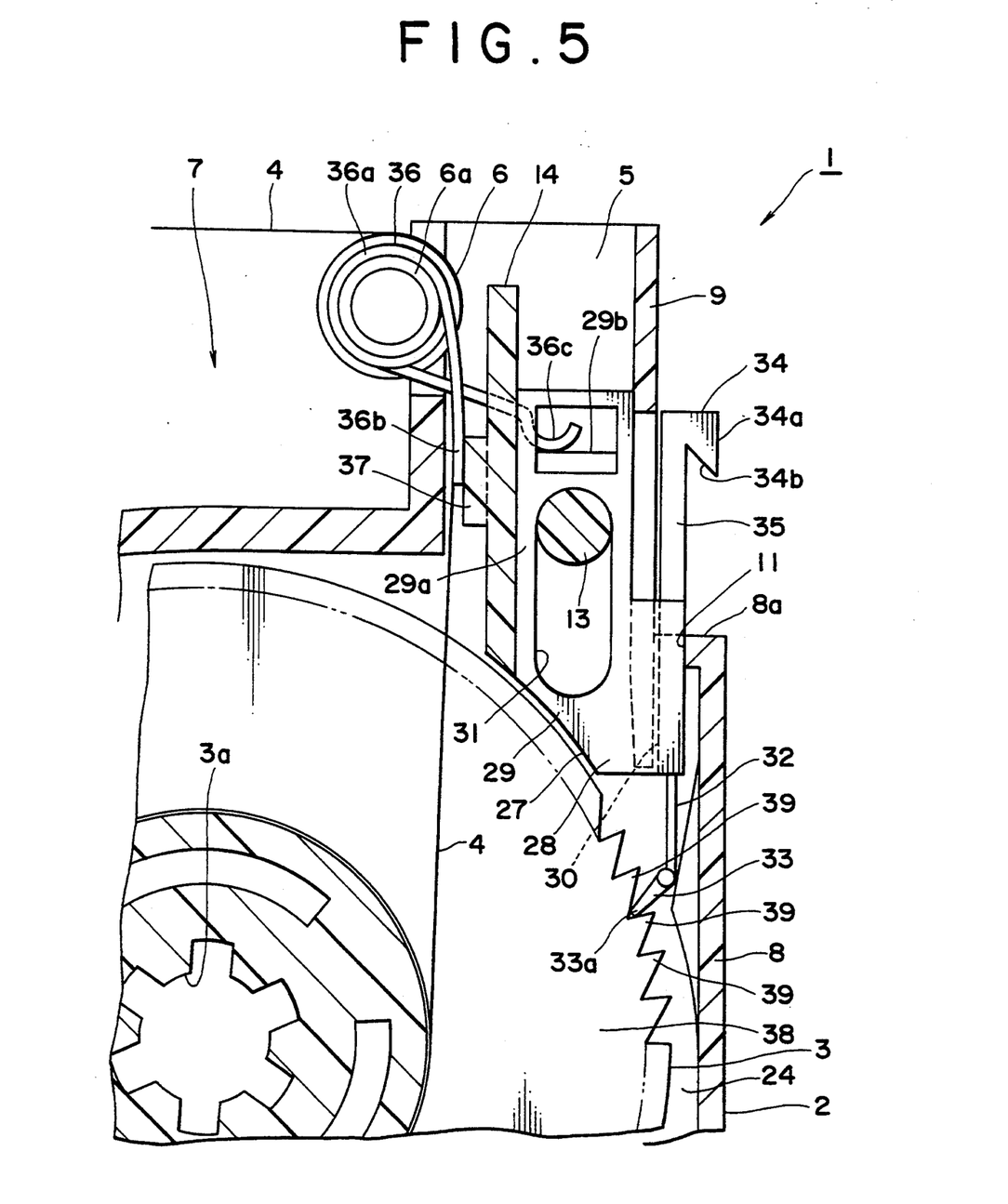
FIG. 5 is an enlarged cross-sectional view of the tape cassette taken along the line V—V of FIG. 4.

The numeric designation 22 is a torsion coil spring to return the front lid. This front lid return spring has its coiled section fitted onto the lid supporting pin 19 of the side section on the right side of the front lid 15 restrainedly between the side section 18 and the lid supporting wall 9 of the cassette casing 2, one of its arms elastically abutting to the spring holder 21 from under and the other elastically abutting to the lower surface of the upper wall 12 of the cassette casing at a position in front of the lid supporting pin 19, thereby energizing the front lid 15 to rotate into its closed position having its front section 16 covering the front surface of the cassette casing 2 (Refer to FIGS. 1 and 4).

Figure 2:
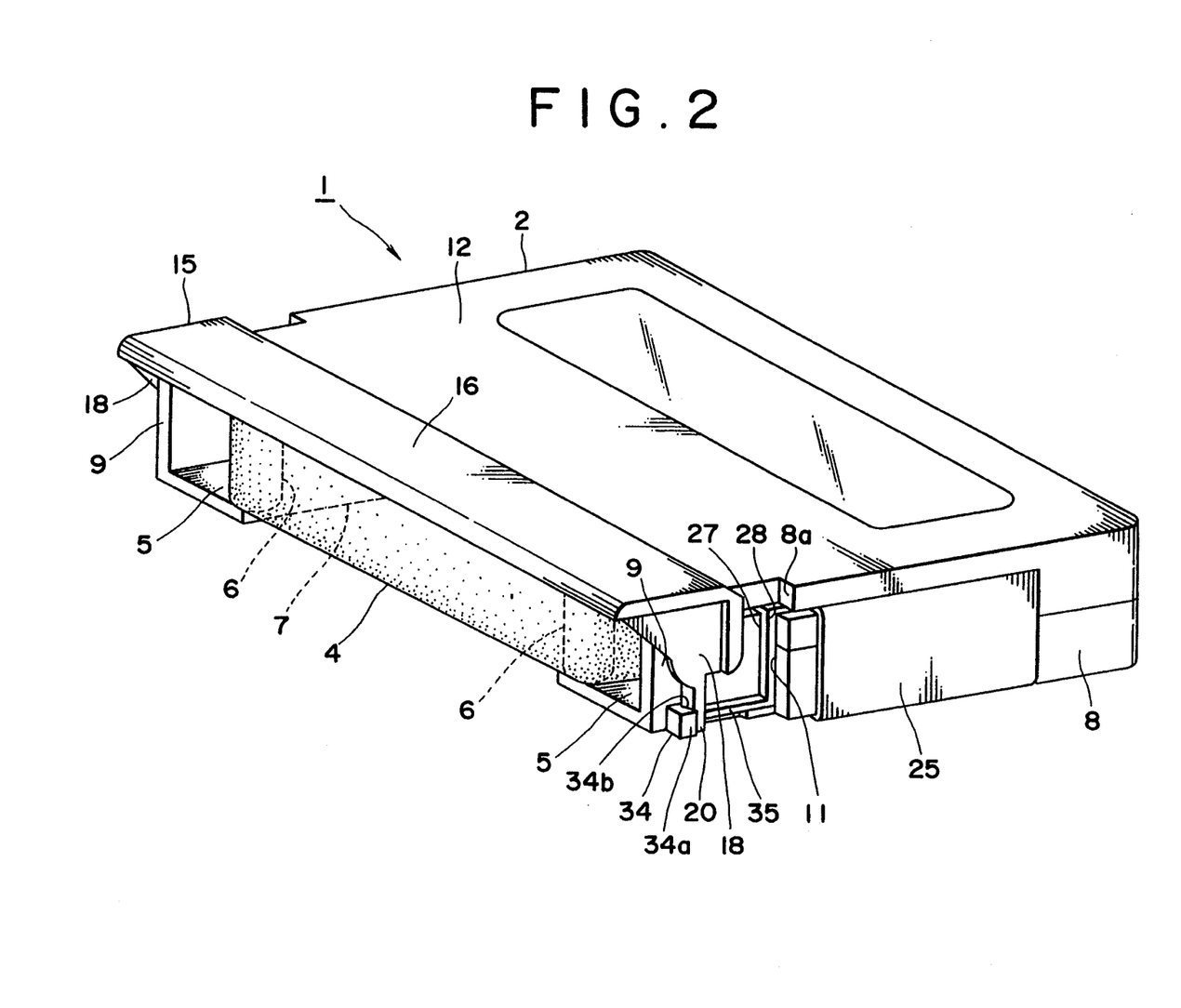
FIG. 2 is a schematic perspective view showing the tape cassette of FIG. 1 with its front lid opened.
Figure 3:
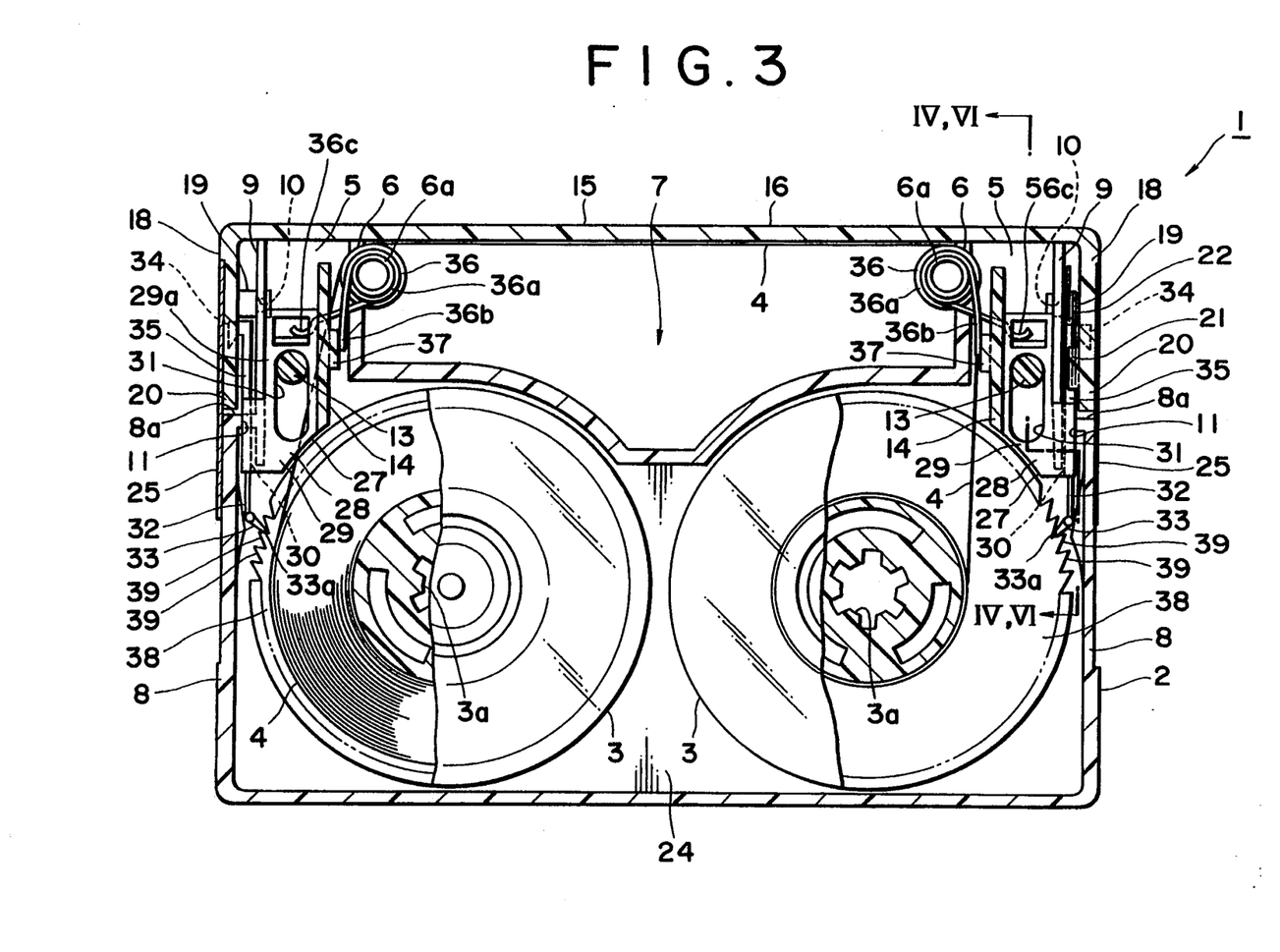
FIG. 3 is a horizontal sectional view of the tape cassette of FIG. 1.
Figure 6:
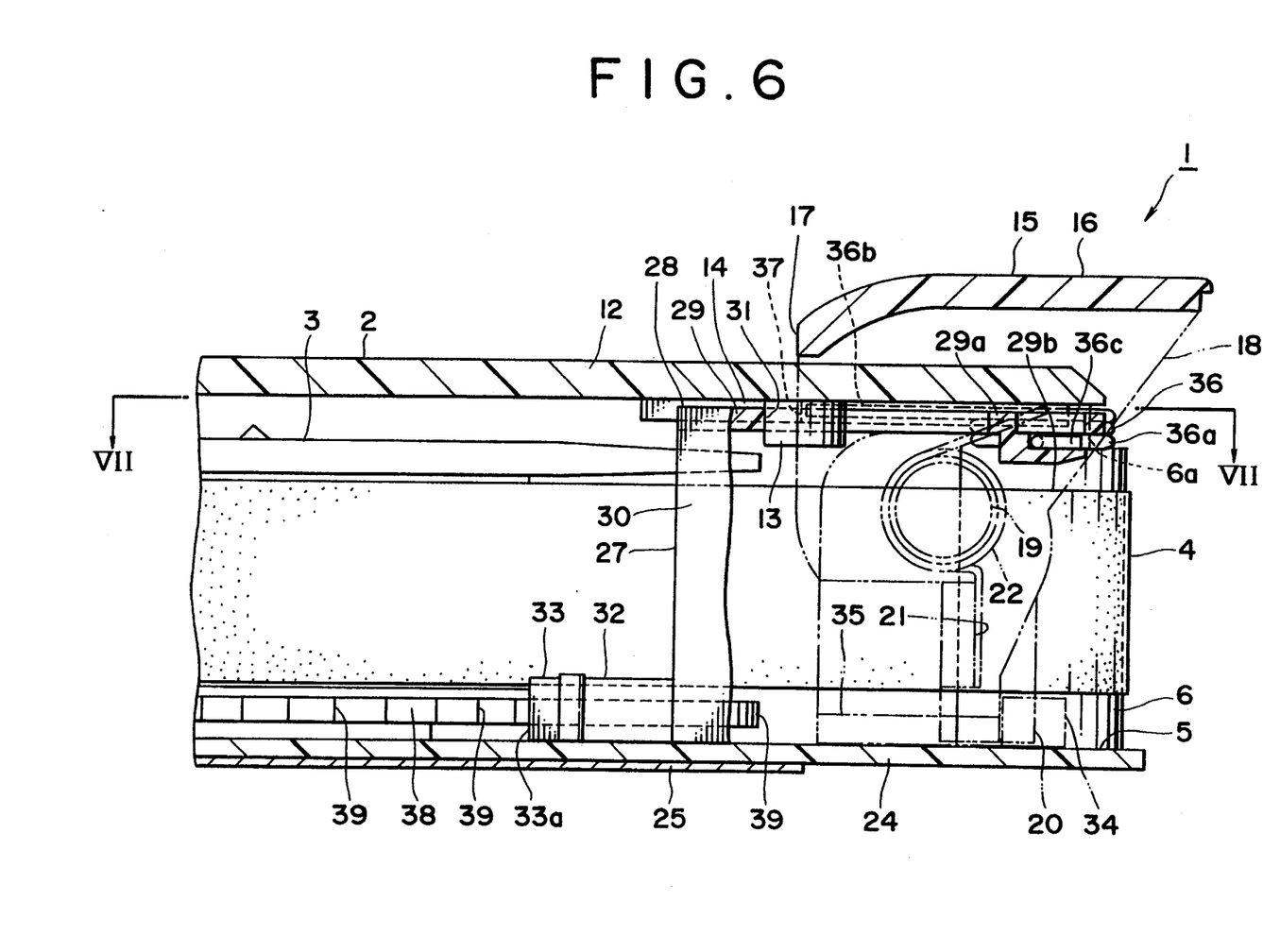
FIG. 6 is an enlarged cross-sectional view of the tape cassette with its front lid opened taken along with the line VI—VI of FIG. 3.
Figure 7:
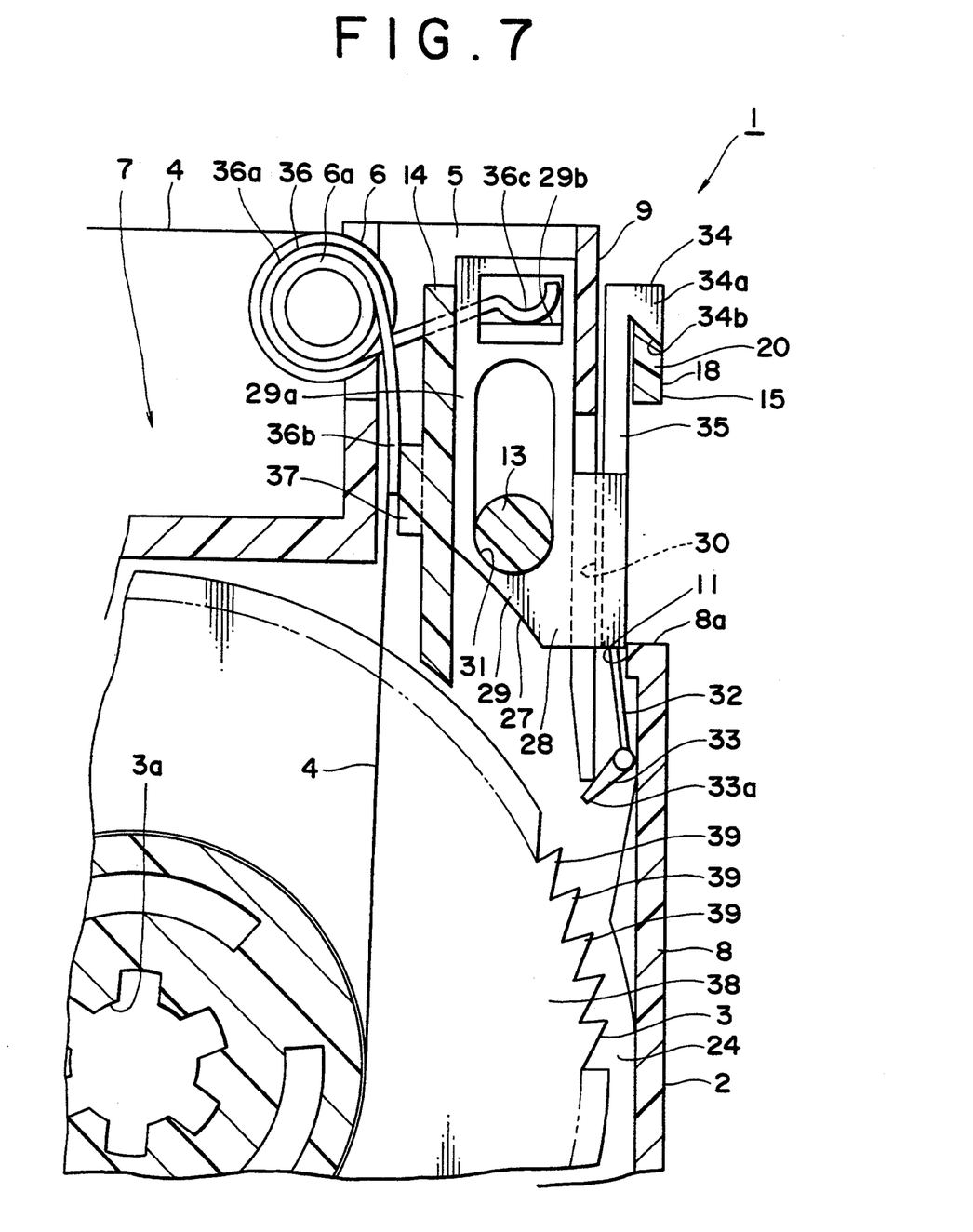
FIG. 7 is a cross-sectional view of the tape cassette taken along the line VII—VII of FIG. 6.

Thus, while the tape cassette set in the cassette holder of a video tape recorder (not shown) is descending toward the cassette loading section of the latter, it has a lid opener provided to the video tape recorder (not shown) abutting to the lower edge of the side section 18 of the front lid 15 and pushing the lower edge of the side section 18 relatively upward to have the front lid 15 rotating upward and shifting its fore section 16 into its release position above the fore end section of the upper wall 12. This is the opened position of the front lid 15 (Refer to FIGS. 2 and 6).

Designated by the numerals 23, 23 are right and left insert holes formed in a bottom surface 24 of the cassette casing 2 with a space provided therebetween. Through these insert holes 23, 23, reel base engagement holes 3a, 3a formed to the reel hubs of the tape reels 3, 3 face outside the cassette casing 2.

Reference numeral 25 indicates a shutter provided to the bottom of the cassette casing 2 slidably in its forward and backward direction as provided to a DAT tape cassette and energized by means of a spring (not shown) to shift forward.

The shutter 25 has a pair of reel base insert holes 26, 26 formed therein on its right and left sides with a space therebetween.

Figure 8:
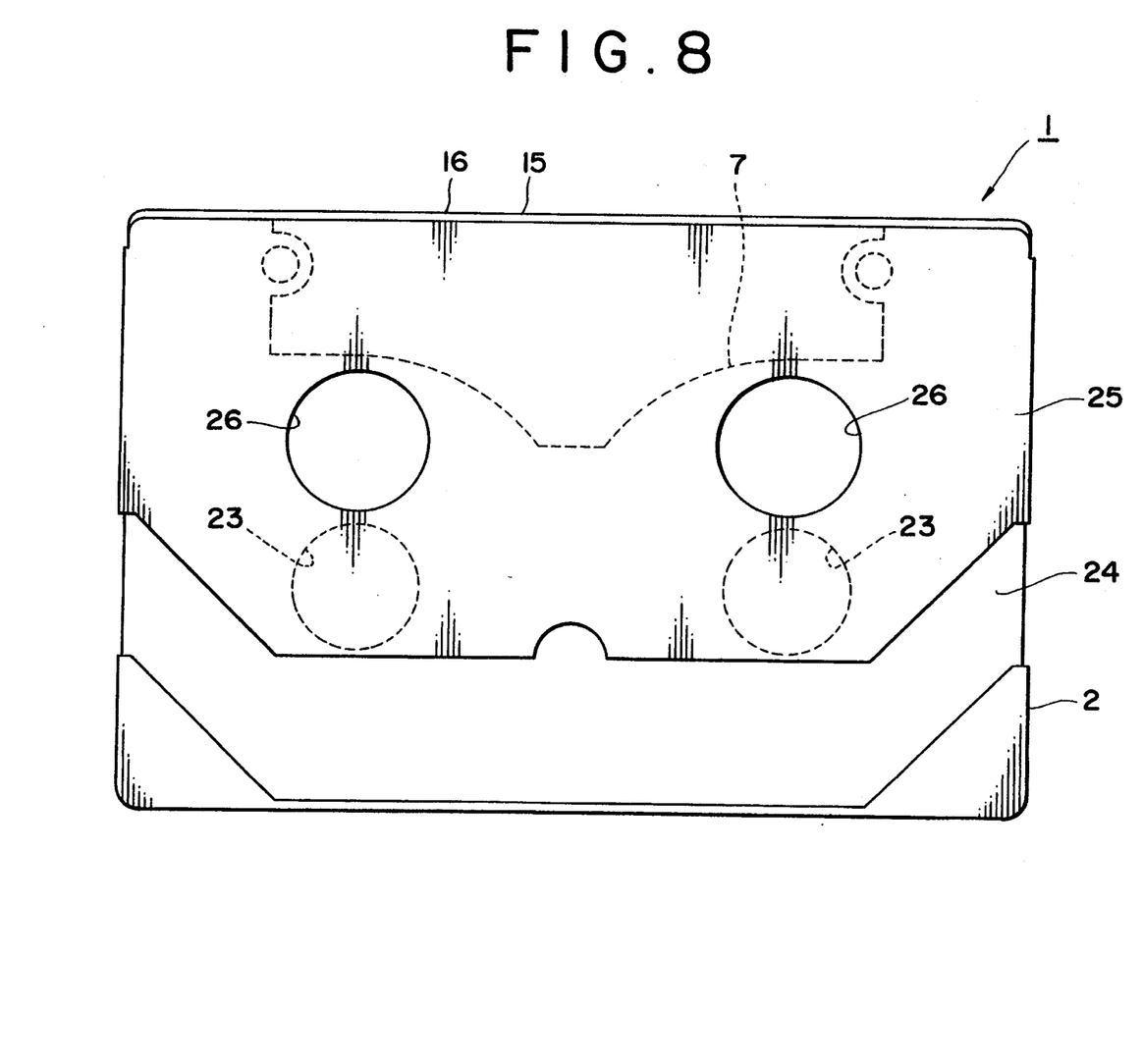
FIG. 8 is a bottom view of the tape cassette showing its shutter closed.

In a state where the shutter 25 is positioned at the fore end of its shifting range or in its closed position, reel base insert holes 26, 26 formed in the shutter 25 position themselves shifted away from the insert holes 23, 23 and, accordingly, the insert holes 23, 23 of the cassette casing 2 stay covered by the shutter 25. At the same time, the mouth section 7 of the cassette casing 2 has its lower side closed by the fore end section of the shutter 25 (Refer to FIGS. 4 and 8). Thus, the mouth section has its front side covered by the front lid 15 and its lower side closed by the shutter 25, completely shut out from outside.

Figure 9:
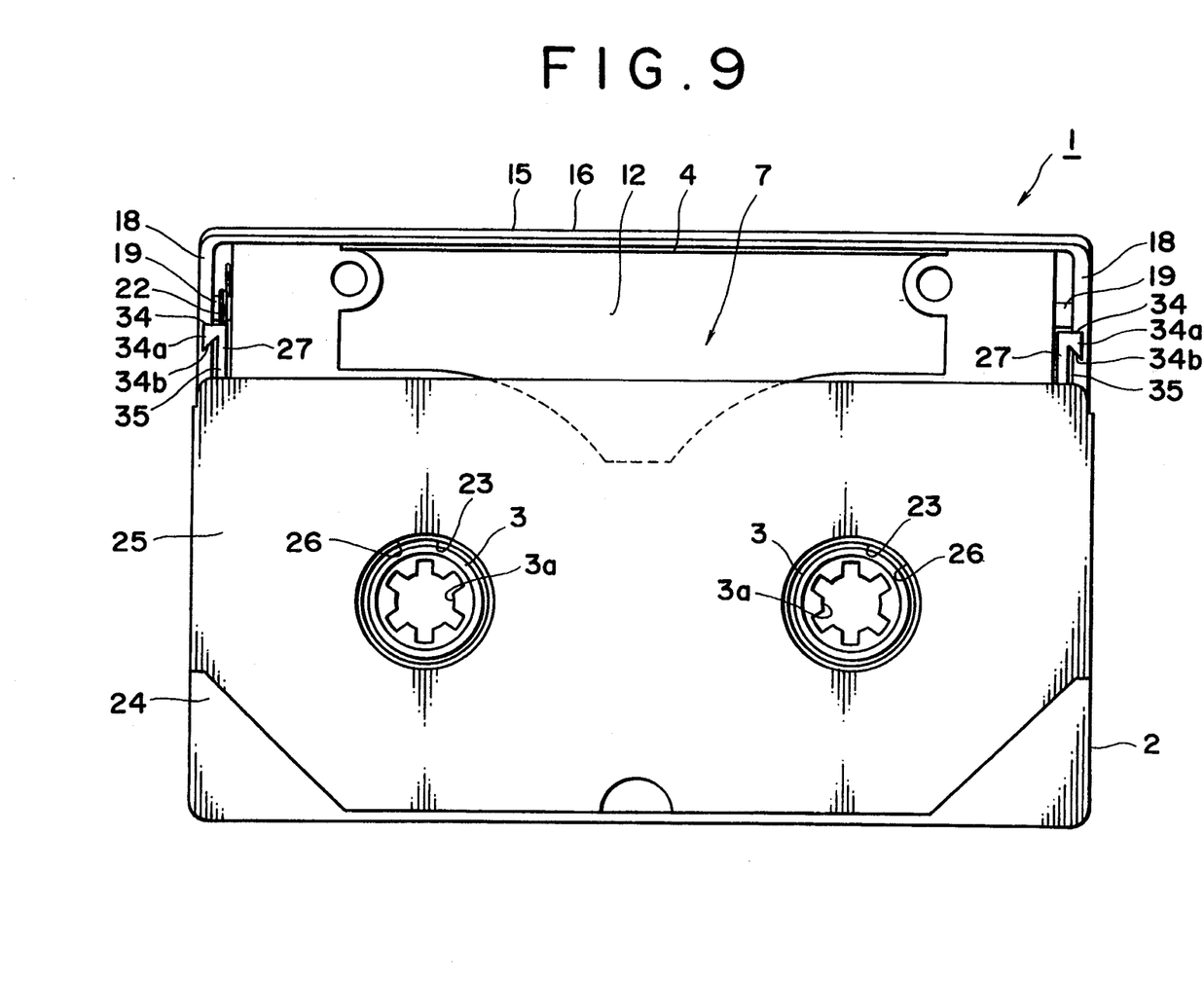
FIG. 9 is a bottom view of the tape cassette showing its shutter opened.
Figure 10:
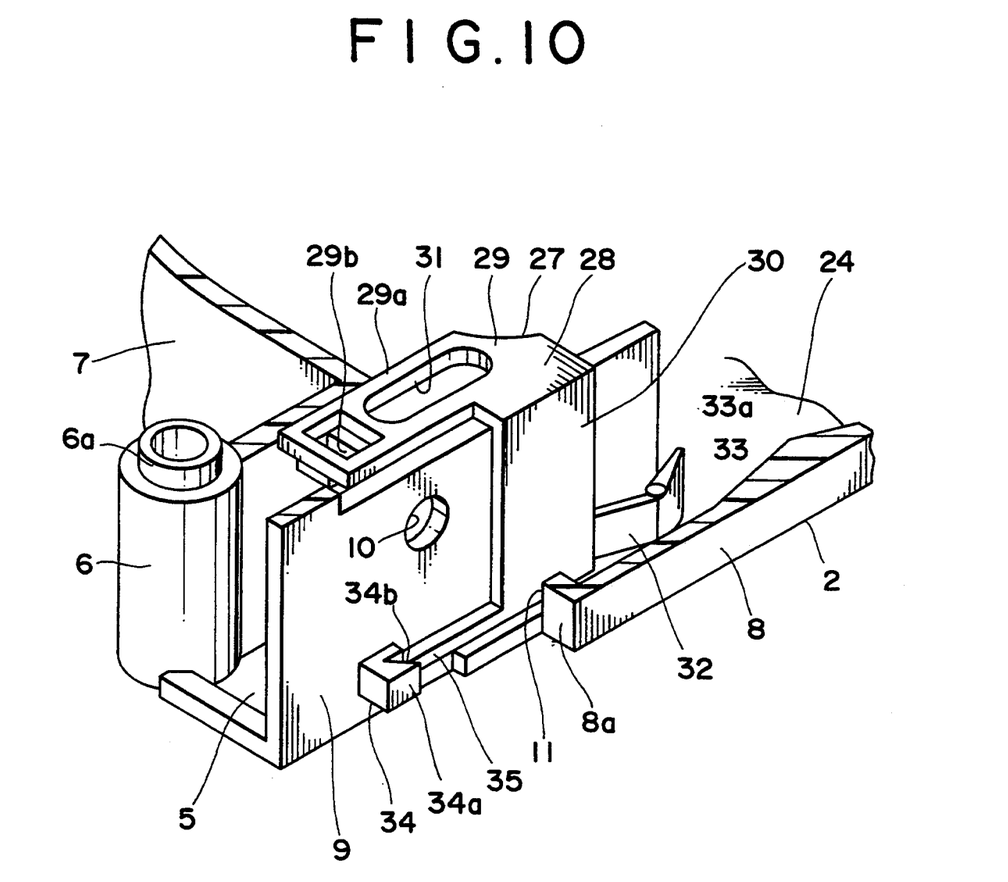
FIG. 10 is an enlarged perspective view of the tape cassette showing its reel lock member and part of its cassette casing.

When the tape cassette 1 is loaded into a video tape recorder, the shutter 25 shifts backward into its opened position as a DAT tape cassette does. When the shutter 25 reaches its opened position, the reel base insert holes 26, 26 of the shutter 25 come in to register with the insert holes 23, 23 of the cassette casing 2, respectively, and the reel base engagement holes 3a, 3a of the tape reels 3, 3 face outside respectively through the insert holes 23, 23 and the reel base insert holes 26, 26 (Refer to FIGS. 6 and 9).

Designated by the numerals 27, 27 are reel lock members provided to the fore halves of the right and left side walls of the cassette casing 2 slidably in their forward and backward directions. As the reel lock members 27, 27 are symmetrical, their form and fitting to the tape cassette are described herein with reference only to one of them 27. Description of the other reel lock member is omitted, although the same reference numerals are fixed to the same parts and elements as used for the one reel lock member 27.

The reel lock member 27 is made of a flexible and elastic resin material and has a primary section, an engagement claw and a lock driving section formed integrally therewith.

A primary section 28 is formed with two plates fitted together to present the form of the letter as seen from its forward and backward direction. The primary section 28 has an upper section 29 extending longitudinally with the side edge of its base section linked integrally with the upper edge of a side section 30, and a guide section 29a extending from its base section in a strip shape and having formed therein a guide opening 31 elongate in its forward and backward direction. The width of the guide section 29a is made equal to or slightly narrower than a space between the projecting guide wall 12 and the lid supporting wall 9 formed on the upper wall of the cassette casing 2. Meanwhile, the guide opening 31 has its width made slightly greater than the outer diameter of the guide pin 13 formed on the upper wall 12 of the cassette casing 2.

The primary section 28 has the lower surface of its upper section 29 having provided at a position directly in front of the guide opening 31 a projecting spring holder 29b extending in its sideward direction.

Designated at 32 is an elastic section projecting backward from the lower half of the side section 30 of the primary section 28 in the form of a thin plate.

The elastic section 32 has an engagement claw 33 projecting from its rear end edge. The engagement claw 33 is formed in the shape of a plate thicker than the elastic section 32 and tapered to have a thinner top. The engagement claw 33 is projected slightly insideward from the rear end edge of the elastic section 32, namely, in a direction where in the case of the reel lock member 27 on the right side, it traces a leftward line gradually toward its top.

A lock driving section 34 has a projection 34a projecting outward from the fore end section of its roughly rectangular plate section, namely, in a rightward direction in the case of the reel lock member 27 on the right side. The projection 34a has its rear surface 34b gradually inclined outward in its backward direction. The lock driving section 34 has the rear surface of its lower end section linked integrally with the lower end section of the front edge of the side section 30 of the primary section 28 by means of a linking member 35.

The reel lock member 27 as described above has the guide section 29a of the primary section 28 positioned slidably in its forward and backward direction between the projecting guide wall 14 and the lid supporting wall 9 formed on the lower surface of the upper wall 12 of the cassette casing 2, the guide opening 31 having slidably fitted therein the projecting guide pin 13 provided to the upper wall 12 and the linking member 35 passed through the elongate opening 11 formed in the cranked section 8a of the side wall 8 of the cassette casing 2 to have the lock driving section 34 positioned outside the lid supporting wall 9.

Reference numeral 36 is a torsion coil spring having its coiled section 36a fitted onto the spring holder 6a at the upper end section of the tape guide 6, one of its arms 36b elastically abutting to a spring holder 37 projecting on the lower surface of the upper wall 12 of the cassette casing 2 from the side of the projecting tape guide 14, and the other arm 36c elastically abutting to the projecting spring holder 29b of the reel lock member 27 from the front side. Thus, the reel lock member 27 is energized to shift in its backward direction, namely, its locking direction.

Incidentally, as the other arm 36c of the torsion coil spring 36 serves to push the guide section 29a of the reel lock member 27 upward, the guide section 29a of the reel lock member 27 is pressed onto the lower surface of the upper wall 12 and, thus, prevented from deviating from its predetermined position.

Reference numerals 38, 38 designate the lower reel flanges of the tape reels 3, 3, which have provided around their peripheries toothed engagement teeth 39, 39. As seen from above, these engagement teeth 39, 39 present the shape of their tops declined in the clockwise direction in the case of a supply reel 3 (left side tape reel) and in the counter-clockwise direction in the case of a take-up reel 3 (right side tape reel) to have engaged therein the tops 33a, 33a of the engagement claws 33, 33.

As described above, when the front lid 15 is in its closed position, its pressing members 20, 20 stay upward in their backward direction away from the lock driving sections 34, 34 of the reel lock members 27, 27, there is nothing to hamper or block the backward movement of the reel lock members 27, 27 caused by the driving force of the torsion coil springs 36, 36.

The reel lock members 27, 27 are thus kept in the backmost position of their shifting ranges, thereby engaging the tops 33a, 33a of the engagement claws 33, 33 in the engagement teeth 39, 39 of the lower reel flanges 38, 38 of the tape reels 3, 3 and holding the tape reels 3, 3 locked.

In this state, the tape reels 3, 3 are each energized through their engagement with the engagement claws 33, 33 to rotate in their direction to take up a magnetic tape 4 and, under the influence of a driving force thus caused inwardly in their slanted backward direction, shifted as a whole away from the tape outlets 5, 5. The magnetic tape 4 is pulled in a direction to be tensioned and prevented from slackening.

When the front lid 15 is rotated in its direction to shift toward its opened position against the elastic force of the lid return spring, the pressing members 20, 20 of the front lid 15 in its rotation abut against the rear surfaces 34b, 34b of the projections 34a, 34a of the lock driving section 34, 34. When the front lid 15 is rotated further from there to shift toward its opened position, the pressing members 20, 20 are caused to push the lock driving sections 34, 34 forward, thereby causing the reel lock members 27, 27 to shift forward against the driving force of the torsion coil springs 36, 36.

When the reel lock members 27, 27 shift forward, the engagement claws 33, 33 and the engagement teeth 39, 39 of the tape reels 3, 3 are released from their engagement and the tape reels 3, 3 are unlocked to rotate freely.

When the front lid 15 is shifted to its closed position, the lock driving sections 34, 34 of the reel lock members 27, 27 are freed from the force pushing them forward and the reel lock members 27, 27 are shifted backward by the driving force of the torsion springs 36, 36, unlocking the table reels 3, 3.

As apparent from the above, a tape cassette according to the present invention which, having a cassette casing having rotatably contained therein a pair of tape reels having fixed thereto respective ends of a tape and a front lid rotatably supported at the fore end of the cassette casing to cover the front surface of the tape partly led out from the cassette casing through tape outlets provided at the fore end of the cassette casing, is characterized by the provision of reel lock members provided to both side walls of the cassette casing slidably in their forward and backward directions to shift in linkage with opening and closing of the front lid, engagement claws provided rotatably at the rear end sections of the reel lock members to engage in and disengage from engagement teeth provided around the flanges of the tape reels, elastic deformable members provided between the engagement claws and primary sections of the reel lock members and guide sections provided to the cassette casing to guide the movement of the reel lock members, whereby the engagement claws of the reel lock members engage in the engagement teeth of the tape reels when the front lid is closed and disengage from the engagement teeth of the tape reels when the front lid is opened.

Thus, a tape cassette according to the present invention, which shifts its reel lock members in linkage with opening and closing of the front lid and releases tape reels from their locked position by the forward movement of the reel lock members and, therefore, requires no elements such as reel lock release pins to be provided to a tape player for the purpose of releasing the tape reels from their locked position, allows a tape player to be made simple in structure and facilitates a multi-tape compatible tape player, more in particular, to be designed easily.

Since it eliminates holes (insert holes for reel lock release pins) formed in a tape cassette casing, a tape cassette according to the present invention allows no dust to get thereinto and does not damage its appearance.

Furthermore, since the reel lock members are provided to both sides of a cassette casing slidably in their forward and backward directions and, when the reel lock members move in their backward directions, their engagement claws engage in the engagement teeth of the tape reels and lock the tape reels, both tape reels are shifted as a whole in a direction to recede away from the tape outlets and are energized to rotate in a direction to tension a tape. Thus, the tape is kept constantly under adequate tension without allowing it to slacken thereby preventing problems such as so-called tape jamming.

In the above described embodiment of the present invention, springs are separately provided to return the front lid and sliding elements to their respective closed or locked positions. However, the same purpose may be achieved by the provision of only a single spring with the other omitted.

Furthermore, concrete forms and arrangements described in the foregoing with reference to a preferred embodiment of the present invention represent only an example to accomplish the purposes and objects of the present invention and, therefore, should not be interpreted to limit or restrict the spirit and technical scope of the invention.

What is claimed is:

1. A tape cassette having a cassette casing containing rotatably therein a pair of tape reels having respective ends of a tape fixed thereto, and a front lid rotatably supported at a fore end of cassette casing to cover a front surface of said tape partly led out from said cassette casing through tape outlets provided at the fore end of the cassette casing, comprising:
   reel lock members provided to both side walls of said cassette casing, said reel lock members being slidable in a forward and backward direction of said cassette casing to shift in linkage with opening and closing of front lid, said reel lock members each having a primary section and a rear end section;
   engagement claws provided at the rear end sections of said reel lock members to engage in and disengage from engagement teeth provided around the peripheries of said tape reels;
   elastic deformable members mounting said engagement claws to said primary sections of said reel lock members;
   guide sections provided to said cassette casing to guide the sliding movement of reel lock members;
   whereby the engagement claws of said reel lock members engage in said engagement teeth of said tape reels when said front lid is closed and disengage from said engagement teeth of said tape reels when said front lid is open; and
   spring means provided to energize said reel lock members in a direction to engage its engagement claws in said engagement teeth and to press said reel lock members against the inner surface of the cassette casing, said spring means comprising torsion coil springs having their coiled sections supportedly fitted onto supporting pins provided at upper end sections of tape guides formed inside said tape cassette.

2. A tape cassette according to claim 1, wherein said primary sections of the reel lock members are formed with two plates fitted together to present the shape of the letter "L".

3. A tape cassette according to claim 2, wherein an upper one of said two plates has guide openings formed therein for slidably receiving guide pins provided on the upper wall of said cassette casing.

4. A tape cassette having a reel locking mechanism, comprising:
   a cassette casing having front and rear ends with a front lid rotatably mounted to said casing for covering said front end;
   a pair of tape reels rotatably mounted within said cassette casing, said tape reels each having a peripheral flange with a plurality of engagement teeth formed thereabout;
   a reel locking mechanism including first and second reel lock members each having an engagement claw extending rearwardly therefrom for mating with said engagement teeth of a respective tape reel, said reel lock members being slidable in a forward and backward direction of said cassette casing in response to opening and closing of said front lid;
   guide means within said cassette casing for guiding the sliding movement of reel lock members;
   elastic deformable members mounting said engagement claws to said reel lock members, said elastic deformable members each having a forward end mounted to a respective reel lock member and a rearward end mounted to a respective engagement claw, said elastic deformable members extending in a fore and aft direction and said engagement claws extending in a direction angled inwardly toward said tape reels; and a tapered surface formed on the inner walls of said cassette casing for engaging said engagement claws and directing the claws into engagement with said teeth of the tape reels.

5. The tape cassette as set forth in claim 4, wherein said first and second reel lock members each comprises a horizontal upper plate having an elongated opening formed therein and a vertical side plate extending from said upper plate, and guide means provided in said cassette casing for guiding said first and second reel lock members for sliding movement in a forward and rearward direction of said cassette casing, said guide means each comprising a pair of spaced apart vertical plates extending in a force and aft direction adjacent a respective side of said cassette casing and a guide pin projecting from said cassette casing between said vertical plates, said reel lock members each being slidably supported between a respective pair of said vertical plates with said guide pin received in said elongated opening.

6. The tape cassette as set forth in claim 5, further comprising spring means operatively connected to said reel locking members for biasing said engagement claws rearwardly into engagement with the teeth of a respective tape reel.

7. The tape cassette as set forth in claim 5, wherein said front lid of the cassette casing includes first and second pressing members adjacent each of said reel locking members, and the side plate of each of said reel lock members includes an abutment surface for engagement by said pressing member, whereby said pressing members engage said abutment surfaces when said front lid is opened to disengage the engagement claws of the reel lock members from said engagement teeth of the tape reels.

8. The tape cassette as set forth in claim 7, wherein said abutment surface is inclined outwardly in a rearward direction.

9. The tape cassette as set forth in claim 8, further comprising a shutter positioned over a bottom portion of the cassette casing, said shutter being slidable in a fore and aft direction and biased into a forward closed position, said shutter locking said front lid in a closed position when said shutter is in said forward closed position.

10. A tape cassette having a reel locking mechanism, comprising:

a cassette casing having front and rear ends with a front lid rotatably mounted to said casing for covering said front end;

a pair of tape reels rotatably mounted within said cassette casing, said tape reels each having a peripheral flange with a plurality of engagement teeth formed thereabout;

a reel locking mechanism including first and second reel lock members each having an engagement claw extending rearwardly therefrom for mating with said engagement teeth of a respective tape reel, said reel lock members being slidable in a forward and backward direction of said cassette casing in response to opening and closing of said front lid;

guide means within said cassette casing for guiding the sliding movement of said reel lock members;

elastic deformable members mounting said engagement claws to said reel lock members; said first and second reel lock members each comprising a horizontal upper plate having an elongated opening formed therein and a vertical side plate extending from said upper plate, guide means provided in said cassette casing for guiding said first and second reel lock members for sliding movement in a forward and rearward direction of said cassette casing, said guide means each comprising a pair of spaced apart vertical plates extending in a fore and aft direction adjacent a respective side of the cassette casing and a guide pin projecting from said cassette casing between said vertical plates, said reel lock members each being slidably supported between a respective pair of said vertical plates with said guide pin received in said elongated opening;

spring means operatively connected to said reel locking members for biasing said engagement claws rearwardly into engagement with the teeth of a respective tape reel; and first and second tape outlets formed in the front end of the cassette casing with supporting pins positioned adjacent each of tape outlets, said spring means comprising torsion coil springs having their coiled sections fitted onto said supporting pins.

11. The tape cassette as set forth in claim 10, wherein the upper plate of each of reel lock members includes a spring holder formed therein for receiving an arm of the coil spring associated therewith.

* * * * *